Figure 6:
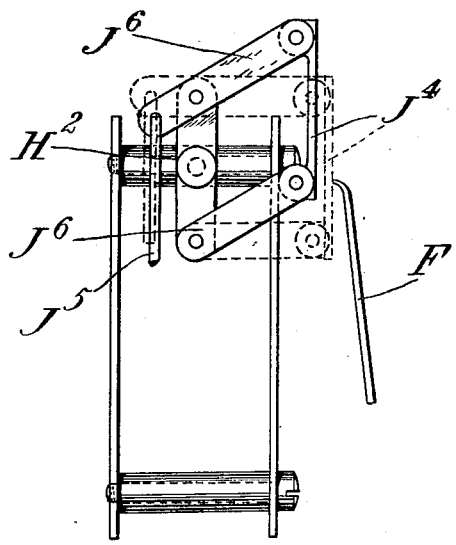

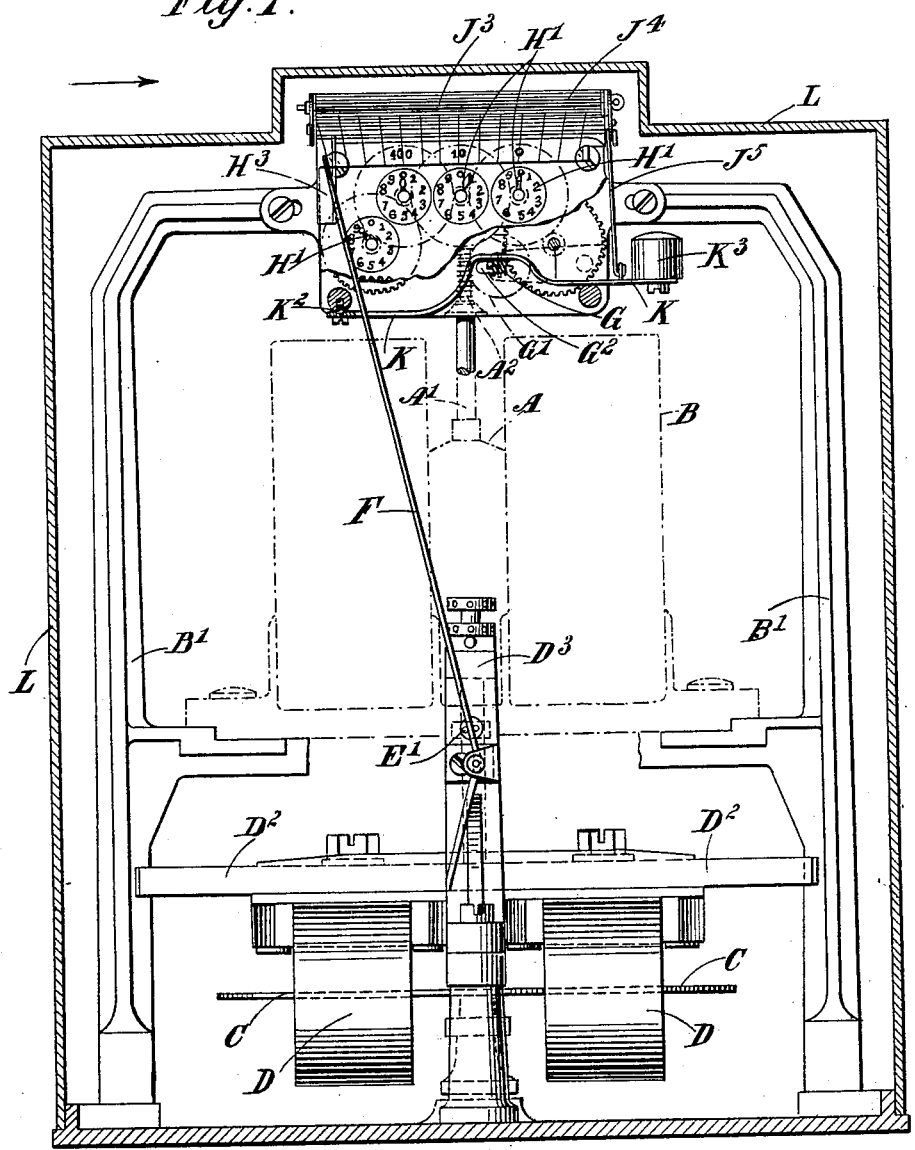

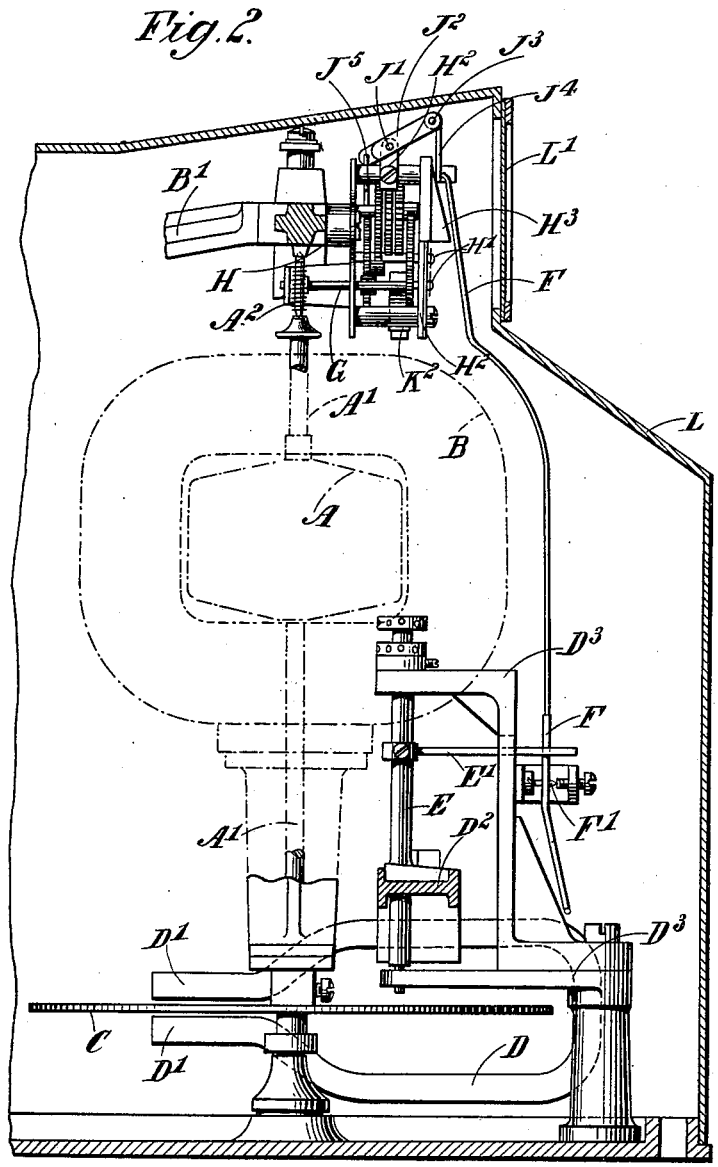

No. 678,929. Patented July 23, 1901.
J. H. BARKER & J. A. EWING.
ELECTRIC METER.
(Application filed Apr. 6, 1901.)
(No Model.) 4 Sheets—Sheet 3.
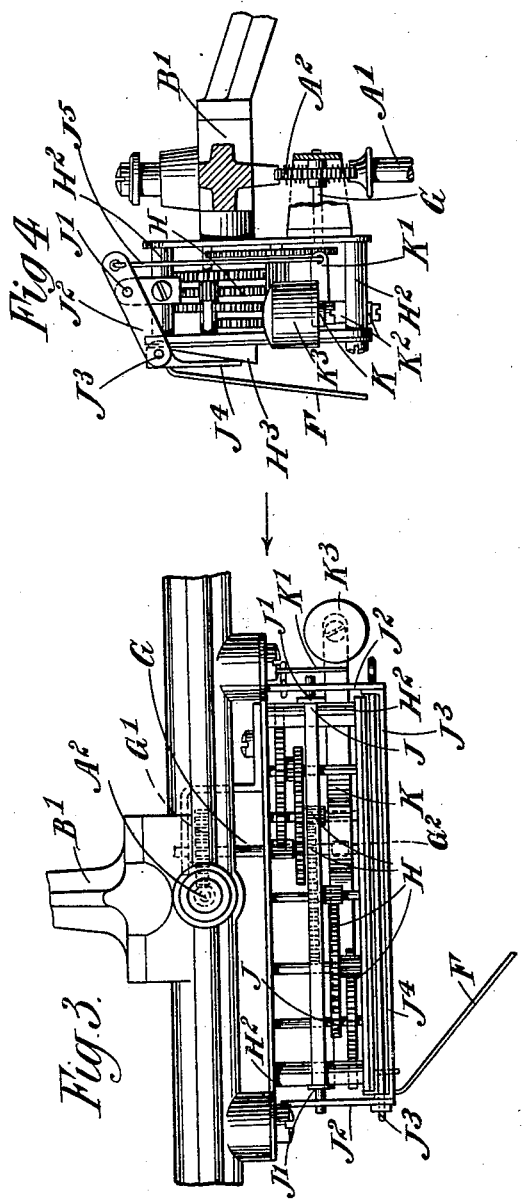
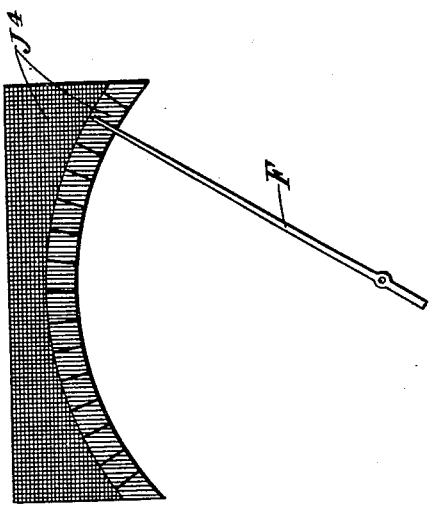
Witnesses
Katherine E. Manning
Jno R Adams
Inventors
John Henry Barker,
James Alfred Ewing,
By Knight Bro
Attorneys
THE NORRIS PETERS CO., PHOTO-LITHO., WASHINGTON, D. C.

No. 678,929. Patented July 23, 1901.
J. H. BARKER & J. A. EWING.
ELECTRIC METER.
(Application filed Apr. 6, 1901.)

(No Model.) 4 Sheets—Sheet 4.

UNITED STATES PATENT OFFICE.

JOHN HENRY BARKER AND JAMES ALFRED EWING, OF CAMBRIDGE, ENGLAND.

ELECTRIC METER.

SPECIFICATION forming part of Letters Patent No. 678,929, dated July 23, 1901.

Application filed April 6, 1901. Serial No. 54,659. (No model.)

*To all whom it may concern:*

Be it known that we, JOHN HENRY BARKER and JAMES ALFRED EWING, both subjects of the King of England, and residing at Cambridge, England, have invented certain new and useful Improvements in or Relating to Electric Meters, (for which application has been made in Great Britain under No. 21,478, dated November 27, 1900,) of which the following is a specification.

Our improvements relate to devices by which a record is obtained of the greatest rate at which electric current or electric energy has been supplied through an electric meter during any given period of time. For this purpose we use an indicator which shows by its deflection or displacement the rate of supply of current or energy, and we obtain a record of the greatest rate of such supply by causing contact to take place from time to time between the indicator and a record-surface in the form of a scale-piece or blank, over which it moves in the course of its deflection. These contacts are made to take place more or less frequently, but are preferably of short duration, so that during the greater part of the time the indicator may be free to move in response to changes in the rate of supply and to exhibit the actual rate of supply at any instant. The scale-piece or blank is coated with lampblack, or is adapted in any other convenient way to be marked in a permanent manner by its contact with the indicator, and the indicator is adapted to mark it. Marks are accordingly made at successive contacts, and the position of the extreme mark serves to show the greatest deflection of the indicator, and consequently the greatest rate of supply. The meter can be set to receive a fresh record by applying a fresh coating of lampblack or otherwise restoring or renewing the surface on which the marks are made. We arrange this device to form part of a meter designed to register the total quantity of electric supply, and we make use of the mechanical movement which actuates the counting-train of such meter to produce the necessary contacts from time to time between the indicator and the scale-piece or blank. Thus, for example, a cam or crank on one of the axles of the counting-train may be connected with the scale-piece or blank in such a manner as to bring it into temporary contact with the indicator once (or oftener) in each revolution of that axle, and thereby cause a periodic record to be made of the position of the indicator so long as the meter is in action. The periodic contact between the scale-piece and the indicator is preferably arranged so that there shall be some relative sliding, with the result that a short line is inscribed at each contact instead of a mere dot.

The device may be used in connection with any suitable indicator of current or energy. By introducing into an electric meter of the integrating type any convenient form of ampere-gage if the meter measures current or wattmeter if the meter measures energy, and registering its deflections in the manner described, we make the meter serve to record maximum rate of supply as well as total quantity of supply. In particular, we apply the device to the type of meter described in our United States Patent No. 643,392, dated February 13, 1900, where the indicator is actuated by the drag between a revolving disk and a pivoted or suspended magnetic brake. When this method of registering the deflection of the indicator is adopted, we dispense with the ratchet and pawl which is there employed to hold the indicator in its position of greatest deflection.

In cases where the indicator is liable to oscillate in consequence of sudden changes in the amount of current or energy we may use a dash-pot or similar contrivance, or we may arrange the periodic contacts between the indicator and the scale-piece or blank to take place in such a manner that the contact serves to apply sufficient friction to check oscillation before the record of position is inscribed.

Figure 7:
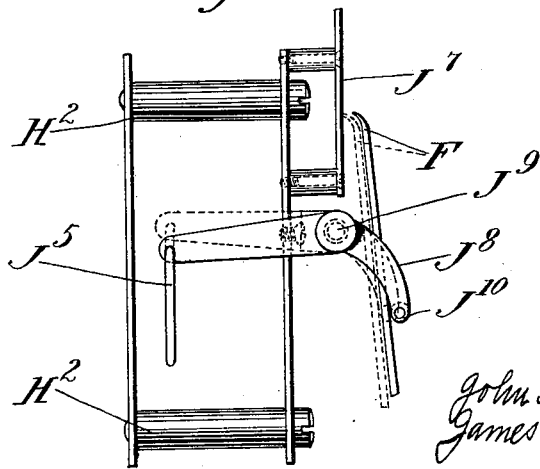

In the accompanying drawings, Figure 1 is a front elevation showing portions of an electric-supply meter provided with one form of recording device according to this invention. Fig. 2 is a side elevation, partly in section, looking in the direction of the arrow in Fig. 1. Fig. 3 is a plan of the counting mechanism and recording device. Fig. 4 is a side elevation of the same looking in the direction of the arrow in Fig. 3, the recording device being in another portion; and Fig. 5 illustrates diagrammatically a portion of a modified form of recording device. Figs. 6 and 7 are side elevations illustrating modified constructions of recording devices, also according to this invention.

Figs. 3, 4, 5, 6, and 7 are drawn to a larger scale than Figs. 1 and 2.

Like letters indicate like parts throughout the drawings.

The meter illustrated in the drawings, by way of example only, is of the kind described in our prior specification above mentioned. The current or energy supplied causes the rotation of an armature A, which with its field-magnet coils B is indicated in chain-lines in Figs. 1 and 2, the field-magnet coils being supported, together with other stationary parts of the meter, upon a frame B'. Attached to the lower part of the armature-spindle A' is a disk C of conducting material, which is caused by the rotation of the armature to revolve between the poles D' of magnets D. These magnets are secured to a cross-bar $D^2$, suspended or pivoted between brackets $D^3$, so that the magnetic system, which in a well-known way forms a magnetic brake for the revolving conductor C, can turn about its axis of suspension against the action of a spring or other controlling force. This spring is not shown in the drawings, as it forms no part of the present invention. It might, however, be within a tube E, fixed to the cross-bar $D^2$, and merely consist of a straight wire forming the suspension for the magnetic brake, the torsion of the wire acting as the controlling force. An adjustable arm E' is attached to the tube E and acts upon a pointer F, pivoted, as at F', in such a way that the upper end of the pointer gives a magnified indication of the amount of movement of the pivoted or suspended magnetic brake.

A counting-train is provided of the type usually found in meters of this class. The armature-spindle A' is provided with a worm $A^2$, which gears with a worm-wheel G' upon a spindle G, and from this spindle G are driven, through a train of gears H, pointers H', which, traveling around their dials, indicate the total amount of current or energy which passes through the meter.

Pivoted, as at J', to a portion of the frame $H^2$, which carries the counting-train, is a spindle J, bearing at each end a lever $J^2$. The front ends of the levers $J^2$ are connected by a pin $J^3$, upon which is supported a record-strip $J^4$. This strip may be of any convenient material—celluloid, for example—and the upper portion, as indicated by the horizontal lines in Fig. 1, is coated with, say, lampblack or otherwise rendered susceptible of receiving a mark, while its lower portion bears equally-spaced division-lines. The back end of one of the levers $J^2$ is joined by a link $J^5$ to an arm K', projecting from a lever K. The lever K is pivoted at one end, as at $K^2$, Fig. 1, and at the other end is provided with a weight $K^3$, and this weight acting through the link $J^5$ tends to keep the record-strip $J^4$ in its highest position, as shown in Figs. 1 and 2. Upon the spindle G is a cam $G^2$, and as the spindle revolves, driven from the worm $A^2$ on the armature-spindle A', the cam $G^2$ lifts the weighted lever K and causes the record-strip to descend into the position indicated in Fig. 4. A wedge-like projection or inclined surface $H^3$ is attached to the frame $H^2$, and this projection causes the record-strip $J^4$ to advance and make a rubbing contact with the pointer F as it descends. The lampblack is scratched off at the line of contact between the pointer F and the record-strip $J^4$, and consequently a record is obtained of the greatest deflection of the pointer, which is a measure of the greatest demand upon the meter since the time the strip was placed in position. To set the meter for another record, the strip may be reblacked or another strip substituted for it. It should be noted that when the record-strip $J^4$ is in its highest position it is clear of the pointer F, which can consequently move unimpeded.

It is preferred to make the record-strip $J^4$ what may be termed a "duplex" strip—that is, to make only the upper portion of its surface susceptible of receiving a mark, while the lower portion is clear or merely provided with permanent division-lines. When the strip begins to descend, the lower or unblacked portion first comes lightly into contact with the pointer, and the slight friction thus introduced serves to damp any oscillation of the pointer before the record is made upon the blacked portion of the strip. It should be noticed that when the record-surface is in its raised position the amount of deflection of the pointer may be read off by means of the division-lines on the lower portion of the strip.

The record-strip $J^4$ and the pointers H', with their dials, can be inspected in the usual way through a window L' in the meter-case. This window L' also provides access to the record-strip for the purpose of reblackening it. A useful medium for blackening the record-strip is a mixture of fine lampblack and spirit, the film thus formed being readily removed by the slight frictional contact between the strip and the pointer.

When a recording device according to this invention is applied to a current or energy indicator, the pointer of which moves through a considerable angle, there may be a tendency for the downwardly-moving record-strip to displace the pointer from the position it takes up due to the current passing through the instrument. To obviate this disadvantage in such cases, the record-strip J⁴ may be provided with fine vertical corrugations, so that the tip of the pointer when in contact with the record-strip will enter one of the grooves and stay in its proper angular position while the record-strip descends. Fig. 5 illustrates diagrammatically one form of such a device, the vertical lines indicating the fine corrugations, while the horizontal lines, as before, represent the blackened portion of the strip.

Various alterations may be made in the details of the apparatus above described without departing from the spirit of this invention. For instance, a spring might be substituted for the weight K³ to raise the record-strip when the lever K is allowed by the cam G² to descend. Again, although the inclined surface H³ forms a convenient means for bringing the record-surface into contact with the indicator, other devices may be employed for that purpose. For instance, the strip J⁴ might be held at the bottom, as well as at the top, by levers, which, assuming a more horizontal position during the descent of the strip, would bring it into contact with the pointer. Fig. 6 illustrates a construction of this kind. The strip J⁴ is pivoted to two arms J⁶, which are themselves pivoted to part of the frame H². One of the arms J⁶ is operated through the link J⁵, as in the construction previously described, and, as indicated in dotted lines in Fig. 6, when the arms J⁶ are caused to assume a more horizontal position the record-strip J⁴ is brought forward into contact with the pointer F.

Although the drawings show one particular form of supply-meter arranged according to this invention with a rate-indicator and a record-surface, it is to be understood that any kind of integrating electric meter may be used, the integrating mechanism fulfilling the additional function of bringing a record-surface and a current or energy indicator into intermittent contact. Thus although Figs. 3 and 4 are enlarged views of portions of the meter shown in Figs. 1 and 2, yet they may also be regarded as forming part of any integrating electric meter, the counting-train H being driven by the current or energy passing through the meter in any convenient way and the pointer F being a current or energy indicator not necessarily moved by a suspended magnetic brake. Again, although it is convenient to employ a movable record-strip, the pointer might be moved into contact with a stationary record-surface, say by the action of a cam-roller or bridge-piece actuated from the counting-train. Such a construction is illustrated in Fig. 7, where a record-strip J⁷ is fixed to part of the frame H². The link J⁵ in this form of apparatus is joined to one end of a bell-crank lever J⁸, of which there are two, pivoted, as at J⁹, one on either side of the frame H². The ends of these levers are joined, as by a rod J¹⁰, this rod being in front of the pointer F. When the link J⁵ is raised, an action which may be brought about by mechanism similar to that shown in the other figures for moving the record-strip, the rod J¹⁰ is carried inward by the action of the bell-crank levers J⁸, and the pointer F, which is made sufficiently flexible, is brought into contact with the stationary record-strip J⁷, making a mark thereon.

Instead of the division-lines being marked upon the lower part of the record-strip, they may, if desired, be upon the front plate of the counting mechanism, so that they are seen through the lower transparent portion of the strip.

What we claim as our invention, and desire to secure by Letters Patent, is—

1. In an electric meter the combination of integrating mechanism, an indicator operated by the current or energy passing through the meter and showing the rate of supply of that current or energy, a record-surface, and means operated by the integrating mechanism to bring the record-surface and the indicator into intermittent contact substantially as set forth.

2. In an electric meter the combination of a counting-train, an indicator operated by the current or energy passing through the meter and showing the rate of supply of that current or energy, a record-surface and an operative connection between the record-surface and the counting-train for the purpose set forth.

3. In an electric meter the combination of a counting-train, an indicator operated by the current or energy passing through the meter and showing the rate of supply of that current or energy, a pivoted record-strip, an operative connection between such strip and the counting-train and an inclined surface acting as a guide to the strip substantially as set forth.

4. In an electric meter the combination of a counting-train, an indicator operated by the current or energy passing through the meter and showing the rate of supply of that current or energy, a pivoted record-strip comprising an upper portion susceptible of receiving a mark, and a lower portion which comes first into contact with the indicator, an operative connection between such strip and the counting-train and an inclined surface acting as a guide to the strip substantially as set forth.

5. In an electric meter the combination of a conductor caused to revolve by the current or energy passing through the meter, a pivoted or suspended magnetic brake in the field of which the conductor revolves, an indicator operated by said brake to show the rate of supply of current or energy passing through the meter, a counting-train registering the total amount of current or energy which is passed through the meter, a cam upon a spindle of the counting-train, a pivoted lever operated by the cam, a pivoted record-strip and an operative connection between the said strip and the pivoted lever substantially as and for the purpose set forth.

In testimony whereof we have signed our names to this specification in the presence of two subscribing witnesses.

JOHN HENRY BARKER.
JAMES ALFRED EWING.

Witnesses:
PERCY M. MARSHALL,
R. A. M. BOWD.